Oct. 28, 1958     C. R. SUTHERLAND     2,858,175
LUBRICATED BEARING

Filed May 20, 1953     2 Sheets-Sheet 1

INVENTOR.
CHARLES R. SUTHERLAND
BY Woodling and Krost
attys

Oct. 28, 1958 — C. R. SUTHERLAND — 2,858,175
LUBRICATED BEARING
Filed May 20, 1953 — 2 Sheets-Sheet 2
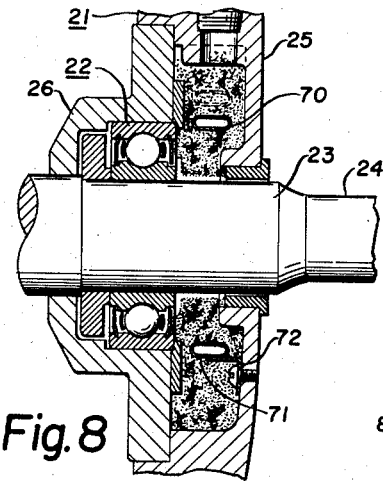
Fig. 8
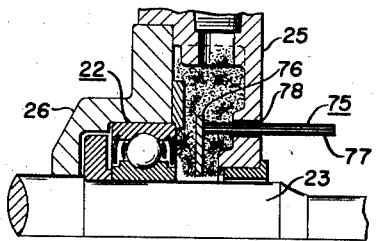
Fig. 10
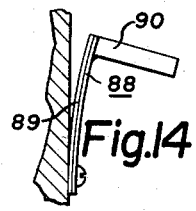
Fig. 14
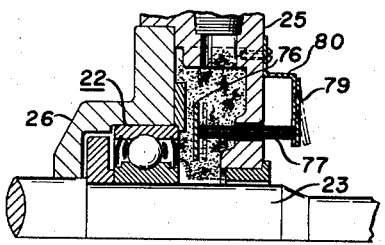
Fig. 11
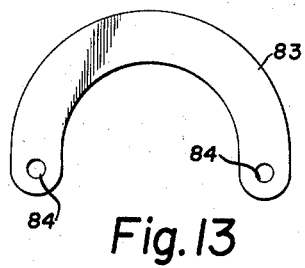
Fig. 13
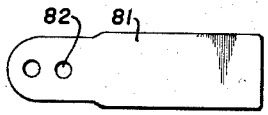
Fig. 12
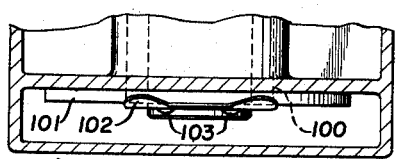
Fig. 18
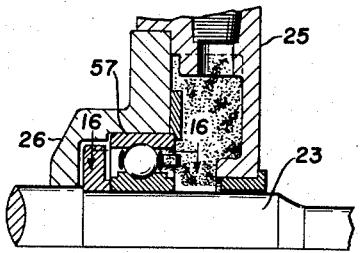
Fig. 15
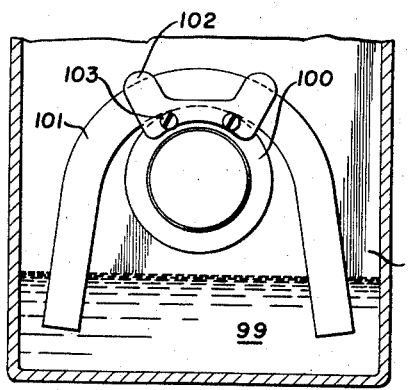
Fig. 17
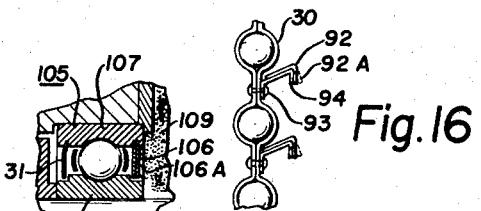
Fig. 19 — Fig. 16
INVENTOR.
CHARLES R. SUTHERLAND
BY Woodling and Krost
attys United States Patent Office 2,858,175
Patented Oct. 28, 1958

2,858,175

LUBRICATED BEARING

Charles R. Sutherland, Cleveland, Ohio, assignor to The Reliance Electric & Engineering Company, a corporation of Ohio Application May 20, 1953, Serial No. 356,161

13 Claims. (Cl. 308—187)

The invention relates in general to bearing constructions and more particularly to bearings in a bearing compartment wherein the lubricant may be disturbed or moved to provide improved lubrication of the bearing.

In machinery having a rotatable part journaled in a stationary part, some form of bearing is provided which may be a sleeve, ball, or roller bearing, or any other form. The bearing is generally provided with some form of lubrication, and this lubrication needs periodic replacement. In bearing compartments containing a bearing and a lubricant in grease form the grease may be added periodically but at rather lengthy intervals. The grease lubricant will form a profile on the stationary portion of the grease, which profile is the boundary between the stationary grease and the moving portion which may be either a moving portion of the bearing or some grease on the moving portion of the bearing. With replacement of the grease at only infrequent intervals the grease may have a tendency to be oxidized or otherwise caked and hardened at this profile so that the net effect is to prevent continued replacement of the lubricant in the bearing proper from the large quantity of stationary lubricant in the bearing compartment.

An object of the invention is to provide improved lubrication to a bearing.

Another object of the invention is to provide a temperature responsive means to provide relubrication of a bearing.

Another object of the invention is to provide movable means to increase lubrication to a bearing.

Another object of the invention is to provide movable means responsive to a temperature condition or a running condition of the bearing to change the profile of the stationary grease in a bearing compartment.

Another object of the invention is to provide a temperature responsive means to break or otherwise disturb the profile of a lubricant which has become caked or oxidized so that fresh lubricant can be provided in a bearing.

Another object of the invention is to provide a bimetallic element in a bearing compartment and positioned next to a bearing so that upon temperature rises the element moves toward the bearing to urge lubricant in the compartment toward the bearing to provide improved lubrication.

Other objects and a fuller understanding of this invention may be had by referring to the following description and claims, taken in conjunction with the accompanying drawings, in which:

Figure 8 is a longitudinal sectional view of another modification;

Figure 10 is a helf-sectional view of another modification;

Figure 11 is a half-sectional view of another modification;

Figure 12 is a plan view of a strip bimetallic element;

Figure 13 is a plan view of a U-shaped bimetallic element;

Figure 14 is a side view of a still further modified form of bimetallic element;

Figure 15 is a half-sectional view of still another modification;

Figure 16 is a sectional view on the line 16—16 of Figure 15;

Figure 17 is a sectional end view of still another modification;

Figure 18 is a top view of the modification of Figure 17; and

Figure 19 is a partial sectional view of a modified form of the invention.

Figure 1:
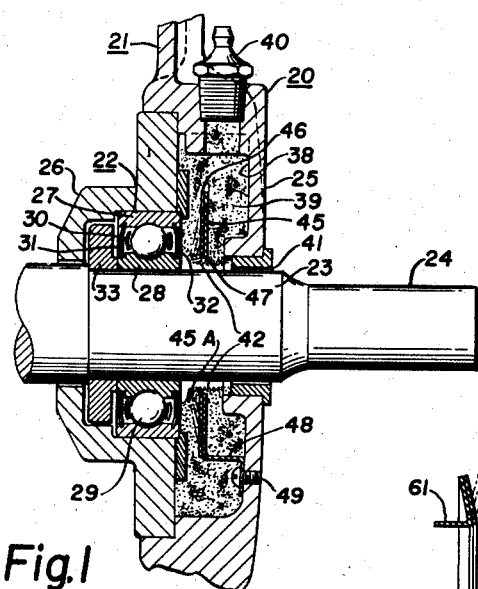
Figure 1 is a longitudinal sectional view through a bearing compartment showing one form of the invention.
Figure 2:
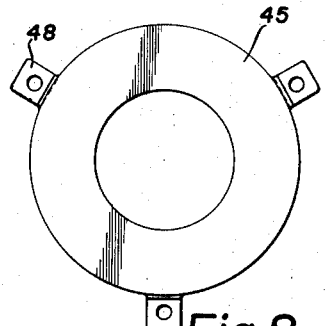
Figure 2 is a plan view of a bimetallic element in Figure 1.

The Figures 1 and 2 show one embodiment of the invention wherein a bearing compartment 20 is mounted in a machine 21 which may be any rotating machinery, for example, an electric motor. The bearing compartment 20 includes a ball bearing 22 journaling a shaft 23 of the machine 21. The machine 21 would be to the left as viewed in Figure 1, and the shaft 23 has an external connecting end 24.

The bearing compartment 20 is formed by an outer wall 25 and an inner wall 26. The bearing 22 has an outer race 27 fastened to the inner wall 26 and an inner race 28 attached to the shaft 23. A plurality of balls 29 is contained within a cage 30 to rollably contact and space the inner and outer races 27 and 28. An inner shield 31 and an outer shield 32 are provided for the bearing 22. The shields 31 and 32 are washer-shaped and fixedly carried by the outer race 27. Their main purpose is to prevent overlubrication of the bearing 22. A collar 33 axially spaces the inner race 28 from a shoulder 34 on the shaft 23, and provides a long grease labyrinth into the machine 21.

The bearing compartment 20 has an annular aperture 38 formed by the outer and inner walls 25 and 26. This aperture is adapted to contain a grease lubricant 39 which may enter through a grease fitting 40 and the grease may exit through a shaft aperture 41 which is provided by a relatively large clearance between the shaft 23 and the outer wall 25. The grease lubricant 39 is added only periodically and the intervals between relubrication are dependent upon the type of service for the machine or motor 21. The recommended greasing schedule may be at intervals of anywhere from three months to nine years. The bearings come lubricated when the machine is first installed, and the plant maintenance men are supposed to follow the relubrication schedule. With the schedule providing for lubrication at only infrequent intervals, which may be up to nine years, it is very definitely a possibility that human failings will mean that lubrication is not done at the proper time. Over-lubrication is considered as damaging under many circumstances as under-lubrication, and this was the primary reason for providing shielded bearings for many applications. Without the shields 31 and 32 the grease would become packed between the balls and the added friction from moving this large quantity of grease would often cause overheating of the bearing.

The grease 39, being stationary within the compartment 20, will have a profile 42 on the stationary portion, with this profile defining the boundary between the stationary and rotating portions. The rotating portion may be the inner race 28 and shaft 23 or it may be grease clinging to these rotating surfaces. This grease 39, being stationary within the compartment 20 for long periods, perhaps several years, may cause the profile 42 to become oxidized or caked into a hard crust such that the bearing 22 fails to become properly relubricated by replenishment from the grease in the compartment 20. The instant invention is directed toward providing some means to disturb or break this profile 42 to cause relubrication of the bearing 22. The Figures 1 and 2 show a bimetallic washer-shaped element 45 disposed within the compartment 20. The bimetallic element 45 has an outer peripheral surface 46 and an inner peripheral surface 47. The inner peripheral surface 47 closely encompasses the shaft 23, and the outer surface 46 is held relatively stationary by three mounting ears 48 which are fastened to the outer wall 25, as by the rivets 49. The bimetallic element 45 is preferably positioned such that upon increasing temperature the element 45 bends toward the bearing 22 as shown by the dash-dot line position 45A. The machine 21 may be shut down once in twenty-four hours or over the week-ends or perhaps only once a year. In any event, the movement from cold to heated positions of the bimetallic element 45 will cause a slight movement of the grease 39 so as to break or disturb the profile 42. This will provide relubrication to the bearing 22.

Figure 3:
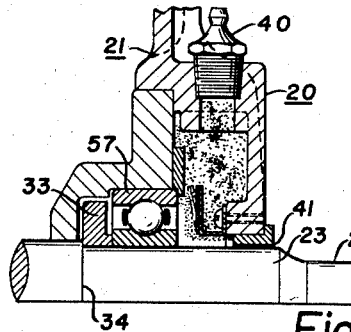
Figure 3 is a half-sectional view of another modification.
Figure 4:
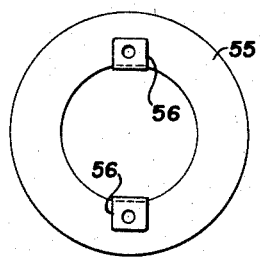
Figure 4 is a plan view of a bimetallic element in the structure of Figure 3.

The Figures 3 and 4 show another form of the invention wherein a bimetallic element 55 is provided. This bimetallic element is also washer-shaped and has two inwardly extending mounting ears 56 so that the inner periphery is held relatively fixed and the outer periphery is that which has the principal movement. This Figure 3 shows an unshielded ball bearing 57.

Figure 5:
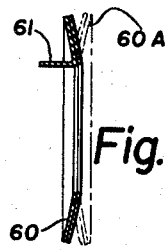
Figure 5 is a sectional view of a snap-acting bimetallic element.

The Figure 5 shows a sectional view through a snap-acting bimetallic element 60. The element 60 is washer-shaped and cupped in a first direction when cool, and it will snap to a second position 60A when heated. The element 60 has mounting ears 61 on the inner periphery so that this inner periphery is held relatively stationary and the outer periphery is that which has the principal movement. It will be understood that the bimetallic element 60 may be mounted as shown in Figure 2 or mounted in any other convenient manner.

Figure 6:
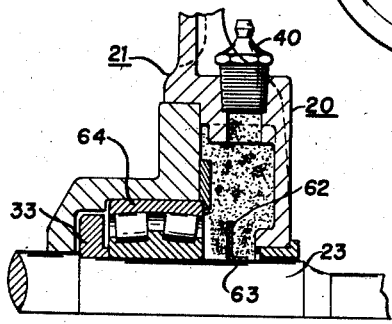
Figure 6 is a longitudinal sectional view of another modification of the invention.

The Figure 6 shows a further embodiment which includes a bimetallic washer-shaped element 62 having an inner cylindrical flange 63. This element 62 is shown as providing increased lubrication to a roller bearing 64. This flange 63 is fixedly mounted upon the shaft 23 so that the element 62 rotates therewith.

Figure 7:
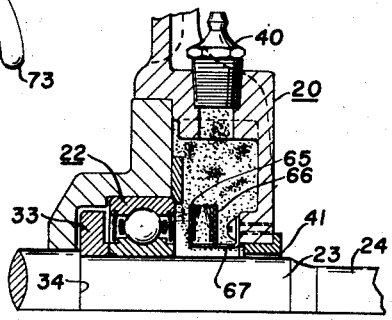
Figure 7 is a half-sectional view of another modification.

Figure 7 shows first and second bimetallic washer-shaped elements 65 and 66 mounted to the compartment wall by mounting ears 67 on the inner periphery of these elements. The elements 65 and 66 are preferably disposed so that upon increasing temperature the elements move toward each other to squeeze the grease out from between these two elements. This will provide an increased movement to the grease 39 and thus disturb the profile 42.

Figure 9:
Figure 9 is a plan view of a Bourdon tube used in the stucture of Figure 8.

Figures 8 and 9 show another modification of the invention including a Bourdon tube 70. This tube circumscribes approximately two hundred seventy degrees of arc within the compartment 20 although it will be apparent that any other arc may be used. The Bourdon tube 70 is a sealed flattened tube filled with a gas and mounted at one end 71 by a mounting ear 72. The second end 73 of the tube 70 will move in and out upon temperature changes because increasing temperature will cause an expansion of the gas within the tube 70 and thus the tube will act as a cantilever beam to be deflected outwardly with increased pressure. All of the tube 70 will thus move upon temperature changes, and this will cause a considerable movement of the grease 39 to disturb the profile 42.

The Figure 10 shows another modification wherein a manual grease agitator 75 is provided within the compartment 20. The agitator 75 may include a vane 76 in contact with the grease 39 and a rod 77 extending through an aperture 78 in the outer wall 25. The fact that the rod 77 extends to the exterior of the machine 21 will permit a maintenance man to periodically move this rod to thus break the profile 42.

Figure 11 shows another modification wherein a bimetallic element 79 is mounted by a mounting foot 80 to the outside of the outer wall 25 with this element 79 positioned to actuate the rod 77 and hence actuate the vane 76. This modification has the advantage of permitting manual movement of the grease when desired and will also provide automatic movement of the grease by temperature changes.

Figure 12 shows an elementary form of bimetallic element 81 which is a straight strip and which easily may be mounted by a mounting ear 82 anywhere within the bearing compartment 20 to disturb the grease 39.

The Figure 13 shows another form of bimetallic element 83 which is generally U-shaped and has mounting holes 84 at the ends of the legs for mounting within the bearing compartment 20. The element 83 will bend, in this case, into and out of the plane of the paper as viewed in Figure 13.

The Figure 14 shows still another form of the invention wherein a bimetallic element 88 has a portion 89 in one plane and a portion 90 in another plane so that upon temperature changes the element 88 will move in two different directions or planes.

The Figures 15 and 16 show another modification of the invention wherein an unshielded bearing 57 is used. A plurality of bimetallic elements 92 may have one end thereof riveted to the cage 30 by rivets 93 which hold together the cage, and these elements 92 have an outwardly extending finger 94. The fingers 94 may be generally parallel to the line of movement when the element is cool and preferably are adapted to move outwardly as shown by the dotted line 92A upon temperature increases so that additional grease is scooped in toward the bearing 57.

The Figures 17 and 18 show a compartment 98 containing an oil reservoir 99 with the compartment containing a sleeve bearing 100. An oil wick 101 is looped up over the bearing 100, and both ends thereof dip into the oil reservoir 99. A U-shaped bimetallic element 102 is fastened by mounting screws 103 to the wall of the compartment 98, and the ends of the U-shaped element 102 are adapted to squeeze the wick 101 against the wall of the compartment 98 upon temperature increases. This alternate squeezing and releasing of the oil wick 101 will increase the oil furnished to the bearing area.

The Figure 19 shows a partial longitudinal sectional view through a ball bearing 105 which may be used in the same way as the bearing 22. The ball bearing 105 has an inner shield 31 and has a bimetallic outer shield 106. This bimetallic outer shield is again carried in the outer race 107 and may extend close to the periphery of the inner race 108. The dash-dot line 106A shows the position of the outer shield 106 upon changes in temperature, and it may move either outwardly or inwardly upon increasing temperatures. The bimetallic outer shield 106 thus provides the bimetallic means compactly within the ball bearing 105 itself, and hence, no additional changes or additions are necessary for the lubricant compartment 109.

Various forms of bearings have been shown such as shielded or unshielded ball bearings, roller bearings, and sleeve bearings. It will be apparent that each of the many forms of bimetallic elements may be used with other forms of bearings than that with which shown.

The Bourdon tube 70 and the various bimetallic elements provide a temperature responsive means which is used to increase the lubrication to a bearing, and they may also be considered as means for increasing the lubrication to a bearing in accordance with a temperature condition or running condition of the bearing. Further, if the lubrication within the bearing proper should become exhausted and the friction of the bearing thereby increased, this increased friction would result in increased heat which will further activate the temperature responsive means to thus provide increased lubrication in response to the increased friction.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a bearing compartment containing a ball bearing and adapted to contain a grease lubricant on one side of said bearing, said grease having stationary and rotating portions with a profile therebetween on said stationary portion, a bimetallic element having first and second portions, said first portion attached to the wall of said compartment, said second portion disposed inside said compartment in contact with said grease and near said one side of said bearing to disturb the profile of said grease upon temperature changes to provide improved lubrication to said bearing.

2. In a bearing compartment containing a ball bearing and adapted to contain a lubricant in grease form on one side of said bearing, said grease having stationary and rotating portions with a profile therebetween on said stationary portion, a washer shaped bimetallic element in said compartment and having three generally equally spaced outwardly extending ears, means for mounting said ears to the wall of said compartment, said bimetallic element disposed inside said compartment in contact with said grease and near said one side of said bearing to move said grease toward said bearing to disturb the profile of said grease upon temperature increases.

3. In a bearing compartment containing a ball bearing and adapted to contain a lubricant in grease form on one side of said bearing, said grease having stationary and rotating portions with a profile therebetween on said stationary portion, a washer shaped bimetallic element in said compartment and having first and second generally opposite ears extending outwardly from the inner periphery thereof, means for mounting said first and second ears to the wall of said compartment, said bimetallic element disposed inside said compartment in contact with said grease and near said one side of said bearing to disturb the profile of said grease upon temperature changes to provide improved lubrication to said bearing.

4. In a bearing compartment containing a bearing and adapted to contain a lubricant, a snap-acting bimetallic element having first and second portions relatively movable responsive to changes of temperature in said compartment, and means mounting said first portion to establish said second portion in said compartment in contact with said lubricant to cause movement of said lubricant in said compartment.

5. In a bearing compartment containing a bearing for co-operation with a revoluble shaft and adapted to contain a lubricant in grease form on one side of said bearing, said grease having stationary and rotating portions with a profile therebetween, a washer shaped bimetallic element in said compartment and attached to said shaft to rotate therewith, said bimetallic element disposed inside said compartment in contact with said grease and near said one side of said bearing to disturb the profile of said grease upon temperature changes.

6. In a bearing compartment containing a bearing and adapted to contain a grease lubricant on one side of said bearing, first and second washer shaped bimetallic elements mounted in said compartment and disposed generally parallel with said bearing and in contact with said grease and near said one side of said bearing, said bimetallic elements deflecting toward each other upon temperature changes in a given sense to squeeze the grease out from between said elements.

7. In a bearing compartment containing a bearing and adapted to contain a grease lubricant on one side of said bearing, said grease having stationary and rotating portions with a profile therebetween on said stationary portion, a straight bimetallic strip having first and second ends, said first end attached to the wall of said compartment, said second end disposed inside said compartment in contact with said grease and near said one side of said bearing to disturb the profile of said grease upon temperature changes to provide improved lubrication to said bearing.

8. In a bearing compartment containing a bearing and adapted to contain grease lubricant, said grease adapted to have stationary and rotating portions with a profile therebetween, a U-shaped bimetallic element having first and second ends, said ends attached to the wall of said compartment, said bimetallic element disposed inside said compartment with the mid-portion thereof in contact with said grease to disturb the profile of said grease upon temperature changes to provide improved lubrication to said bearing.

9. In a bearing compartment containing a bearing and adapted to contain a grease lubricant on one side of said bearing, a bimetallic strip having first and second portions disposed in two different planes, and means mounting said first portion within said compartment to establish said second portion in contact with said grease to disturb said grease in two directions upon temperature changes.

10. In a bearing compartment containing a ball bearing and adapted to contain grease lubricant, said ball bearing having inner and outer races with a plurality of balls therebetween mounted in a cage, a bimetallic element in said compartment in contact with said grease and mounted on said cage to rotate therewith.

11. In a bearing compartment containing a bearing and adapted to contain a lubricant, a wick saturable in said lubricant and disposed adjacent said bearing to aid in lubricating same, and a bimetallic element contactable with said wick upon temperature changes to provide improved lubrication to said bearing.

12. A bearing, comprising first and second races with rollable elements therebetween, and a bimetallic shield carried by one of said races and movable relative to the other of said races with temperature changes.

13. In a bearing compartment containing a bearing for a rotating shaft and adapted to contain a lubricant, bimetallic means having first and second portions, means for mounting said first portion to one of said shaft, bearing and bearing compartment to establish said second portion inside said bearing compartment in physical contact with said lubricant, said second portion movable and in contact with said lubricant to move same.

References Cited in the file of this patent

UNITED STATES PATENTS

| | | |
|---|---|---|
| 731,978 | Tobin | June 23, 1903 |
| 1,191,188 | Julien | July 18, 1916 |
| 1,570,873 | Brown | Jan. 26, 1926 |
| 2,126,129 | Moore | Aug. 9, 1938 |
| 2,440,331 | Eisensmith | Apr. 27, 1948 |
| 2,457,537 | Douglass | Dec. 28, 1948 |
| 2,516,567 | Hamm | July 25, 1950 |

FOREIGN PATENTS

| | | |
|---|---|---|
| 269,669 | Great Britain | Apr. 27, 1927 |